United States Patent
Leach

(10) Patent No.: US 8,287,988 B2
(45) Date of Patent: Oct. 16, 2012

(54) POWDER-COATED GLASS PRODUCTS

(75) Inventor: Roger John Leach, Kingston-by-Lewes East Sussex (GB)

(73) Assignee: Thorstone Business Management Limited, Port Erin, Isle of Man (GB)

( * ) Notice: Subject to any disclaimer, the term of this patent is extended or adjusted under 35 U.S.C. 154(b) by 576 days.

(21) Appl. No.: 10/591,223

(22) PCT Filed: Mar. 2, 2005

(86) PCT No.: PCT/GB2005/000782
§ 371 (c)(1),
(2), (4) Date: Aug. 31, 2006

(87) PCT Pub. No.: WO2005/085150
PCT Pub. Date: Sep. 15, 2005

(65) Prior Publication Data
US 2007/0172671 A1    Jul. 26, 2007

(30) Foreign Application Priority Data
Mar. 2, 2004    (GB) .................................. 0404655.3

(51) Int. Cl.
*B32B 17/06*    (2006.01)
*C08F 2/46*    (2006.01)
*B05D 1/12*    (2006.01)

(52) U.S. Cl. ......... 428/192; 428/426; 427/508; 156/349

(58) Field of Classification Search .................. 427/493, 427/521; 264/458; 219/711; 65/29.18, 60.1–60.5
See application file for complete search history.

(56) References Cited

U.S. PATENT DOCUMENTS

| | | | | | |
|---|---|---|---|---|---|
| 1,988,964 | A | * | 1/1935 | Barrows | .......................... 428/34 |
| 3,355,574 | A | * | 11/1967 | Bassett, Jr. | ................ 219/452.11 |
| 3,549,466 | A | * | 12/1970 | Boucher et al. | .................. 428/38 |
| 3,758,996 | A | * | 9/1973 | Bowser | ........................ 55/385.1 |

(Continued)

FOREIGN PATENT DOCUMENTS
GB    2 207 089 A    1/1989
(Continued)

OTHER PUBLICATIONS
Weinlader et al. "VIG-Vacuum Insulation Glass", (2005), pp. 1-8.*
(Continued)

*Primary Examiner* — Maria Veronica Ewald
*Assistant Examiner* — Prashant J Khatri
(74) *Attorney, Agent, or Firm* — Davis & Bujold, P.L.L.C

(57) ABSTRACT

A powder-coated glass panel in which print (5) on the back (4) of a transparent polyester coating (2) carried by a glass sheet (1), is covered by an epoxy coating (6), and the longitudinal margin (9) of metal foil (7) covering the edges of the panel overlaps onto the back of the coating (6) to relieve thermal stress in the sheet (1). Heat to melt and cure the powders forming the coatings (2, 6) and to cure the printing ink (5) is applied through the sheet (1) from infra-red lamps (22) mounted within an internally-reflective trough (23). The frequency of the radiation is varied from high to low during heating. A double-glazed spandrel unit includes the panel (31) mounted with spacing behind a facing-sheet (32), and with metal foil (34) covering the edges of the unit and overlapping marginally (37) onto the back (38) of the panel (31) for thermal-stress relief.

12 Claims, 3 Drawing Sheets

U.S. PATENT DOCUMENTS

| | | | | |
|---|---|---|---|---|
| 4,022,601 A | * | 5/1977 | Sopko | 65/60.52 |
| 4,420,502 A | | 12/1983 | Conley | |
| 5,300,174 A | * | 4/1994 | Leach et al. | 156/283 |
| 5,330,602 A | | 7/1994 | Leach | |
| 5,468,542 A | | 11/1995 | Crouch | |
| 5,714,199 A | | 2/1998 | Gerhardinger et al. | |
| 6,218,483 B1 | * | 4/2001 | Muthiah et al. | 525/526 |
| 2001/0031817 A1 | * | 10/2001 | Hashizume | 524/439 |
| 2003/0079369 A1 | * | 5/2003 | Luski et al. | 34/423 |

FOREIGN PATENT DOCUMENTS

| | | | |
|---|---|---|---|
| GB | 2 252 079 A | | 7/1992 |
| GB | 2 342 598 A | | 4/2000 |
| GB | 2 342 599 A | | 4/2000 |
| GB | 2 342 600 A | | 4/2000 |
| JP | 56-70874 | | 6/1981 |
| WO | WO-91/02648 | | 3/1991 |
| WO | WO0020347 A1 | * | 4/2000 |

OTHER PUBLICATIONS

Wang, S.K. "Handbook of Air Conditioning and Refrigerations", McGraw-Hill, (2001). pp. 8.31-8.36.*

Horinka, P.R. "Understanding Infrared Curing", (Mar. 2, 2003) online article found at archive.org http://web.archive.org/web/20030302150552/http://pfonline.com/articles/020302.html.*

De Jong et al. "Glass". Ullman's Encyclopedia of Industrial Chemistry, (2000). pp. 1-89.*

* cited by examiner

POWDER-COATED GLASS PRODUCTS

This application is a national stage completion of PCT/GB2005/000782 filed Mar. 2, 2005 which claims priority from British Application Serial No. 0404655.3 filed Mar. 2, 2004.

FIELD OF THE INVENTION

This invention relates to powder-coated glass products and methods of their manufacture.

BACKGROUND OF THE INVENTION

According to one aspect of the present invention there is provided a method of manufacturing a powder-coated glass product wherein a thermosetting powder is deposited on a glass substrate and the powder is cured to form the coating by heat applied to the powder through the substrate.

In previous methods of powder-coating a glass substrate, heat to cure the deposited powder is applied from above the substrate, rather than as with the present invention, through the substrate. With heat for curing the powder applied through the substrate in accordance with the present invention, the powder cures progressively from the substrate upwardly through the thickness of the powder deposit so as to ensure that gasses are not trapped in the resultant coating and that the resultant coating is generally homogenous without pinhole or 'fisheye' defects.

The glass substrate in the method of the invention may be heated prior to deposition of the powder so that the powder adheres to the glass surface as it is deposited. Adhesion may be enhanced by use of an adhesion promoter included within the powder; alternatively, the surface on which deposition is to take place may be pre-treated with the promoter.

Heat may be applied to the powder through the substrate from a source of infra-red radiation which may be mounted within a box having a reflective internal surface. Transmission of the heat to the glass substrate may be mainly by conduction from the box, and to the powder mainly by the radiation through the substrate. The frequency of the infra-red radiation may be regulated from a higher frequency to a lower frequency as the powder progresses from melt towards cure.

Metal foil may be adhered to a back surface of the coating for reduction of thermal stress in the glass substrate, the metal foil extending inwardly from the edges of the coating across the back surface by a distance within the range of 100-150 mm. The thickness of the metal foil may be within the range 75-150 µm.

According to another aspect of the present invention there is provided a powder-coated glass product wherein a glass substrate is backed by a powder coating and metal foil is bonded to the back surface of the coating to extend inwardly from the edges of the product across the back surface by a distance within the range of 100-150 mm for reduction of thermal stress in the glass substrate.

The metal foil may be bonded to the back surface of the coating to extend inwardly from the edges of the product across the back surface by substantially 125 mm, and the thickness of the metal foil may be within the range 75-150 µm.

BRIEF DESCRIPTION OF THE DRAWINGS

A powder-coated glass panel and a method of manufacturing it, all according to the present invention will now be described, by way of example, with reference to the accompanying drawings, in which.

DETAILED DESCRIPTION OF THE INVENTION

Figure 1:
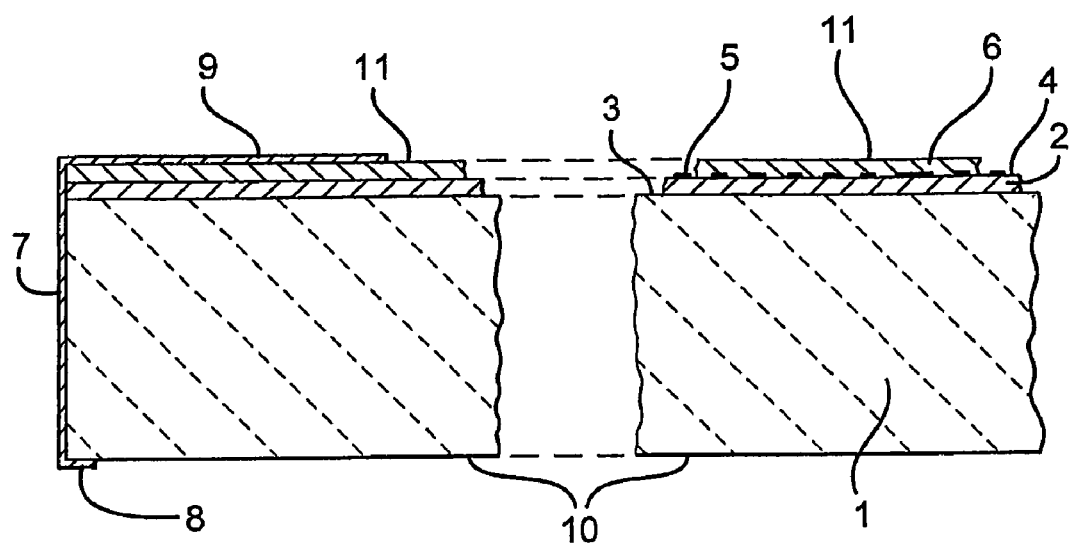
FIG. 1 is a representative section of part of the powder-coated panel of the invention.

Referring to FIG. 1, the panel is faced by a rectangular sheet 1 of clear glass (having a thickness, for example, of 6 mm) which carries a transparent, polyester powder-coating 2 that is bonded to a back surface 3 of the sheet 1. The back surface 4 of the coating 2 is printed with one or more images in ink 5 and the whole of the printed surface 4 is covered by a further powder-coating 6 of white or other color. The coating 6, which provides the background against which the one or more printed images on the surface 4 can be viewed through the glass, is of an epoxy resin. Both coatings 2 and 6 have a thickness of 250 µm.

Figure 2:
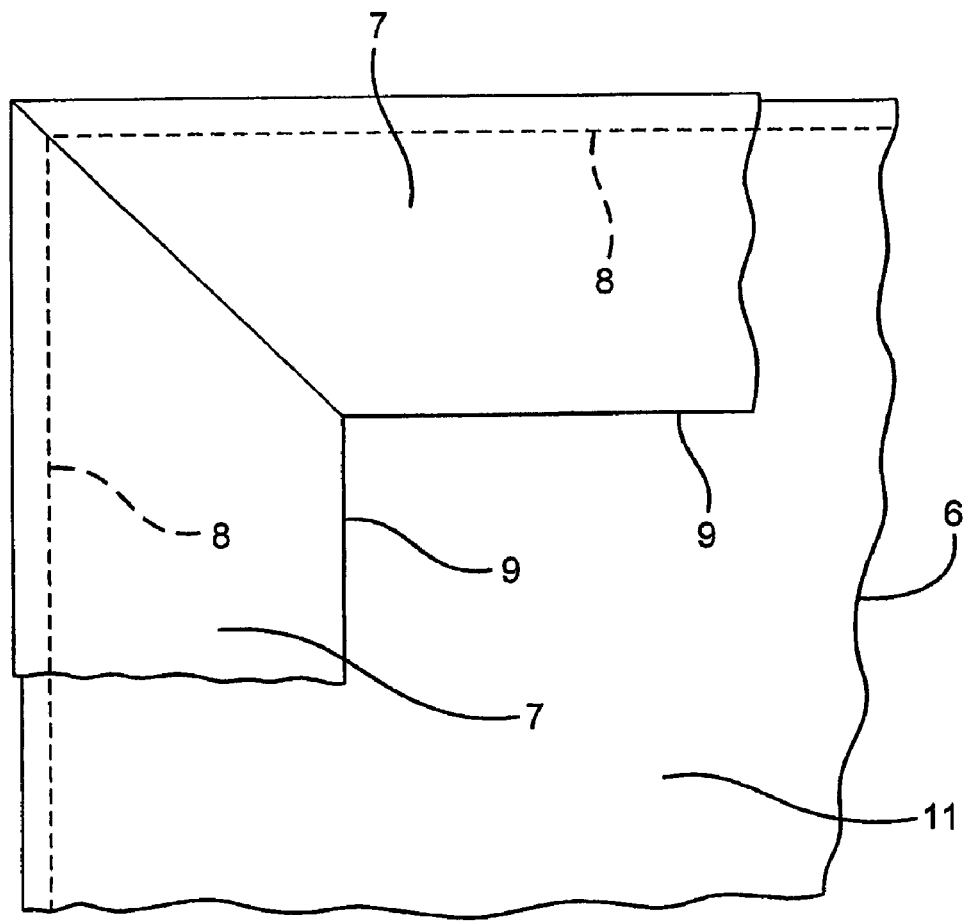
FIG. 2 is a partial plan view from the rear of the panel of FIG. 1.

Referring now also to FIG. 2, the four side-edges of the panel are covered respectively by metal strip 7 of aluminum (or other metal) foil that is bonded to the panel and mitered at the corners (there may be overlapping at the corners instead). The strip 7 extends lengthwise along the respective side-edges of the panel and has longitudinal margins 8 and 9 that are bonded and wrapped round onto, respectively, the front surface 10 of the glass sheet 1 and the back surface 11 of the coating 6.

The panel of FIGS. 1 and 2, which may be used for example for architectural purposes, is manufactured using a method according to the present invention, in which the glass sheet 1 is first cleaned in a washing station. After drying, the sheet 1 is heated to 160 degrees Celsius and moved horizontally by conveyer with its surface 3 uppermost into a station where polyester thermosetting powder-coating material in finely-divided form is deposited on the surface 3 by electrostatic or tribostatic method. Because the sheet 1 is pre-heated, the powder tends to adhere to the surface 3 so that the deposit is not easily disturbed and good dispersion of the powder is achieved.

The sheet 1 carrying the deposited polyester powder is next moved into an oven where heat is applied to bring the powder through its melt phase into its gel state. The heat is applied through the sheet 1 from below to raise the temperature of the powder to some 180 degrees Celsius. The powder-coating material is brought to a substantially hard, but not to the fully cross-linked final form of the coating 2, leaving it about 70% cured.

One or more images in the ink 5 are now printed on the back surface 4 of the coating 2 in its partly-cured state, using a silk-screen, bubble-jet or laser printing technique. The printing may be half-tone or line print, and where colour is involved is applied as a colour-separated print image. The ink used is a hybrid to the extent that it has ultra-violet and thermo-curing properties. The ultra-violet curing property is used between successive steps in the colour-separation process to harden the ink after each ink application to the extent that the print is touchable without smudging and will not run, but is still soft; desirably the ink contains a reactive agent that gives it a high cure-rate to ultra-violet light. The print is applied in the reverse order from convention, since the image is to be viewed through the glass sheet 1 and clear coating 2.

Following application of the print image(s), epoxy thermo-setting powder-coating material containing appropriate pigments to give the white or other color for the background to the printed image(s), is deposited in finely-divided form on the printed surface 4 by electrostatic or tribostatic method. The sheet 1 with the deposited epoxy powder is now moved into a curing oven where the epoxy powder is melted and cured into the hardened coating 6 concurrently with completion of cure of the coating 2 and ink 5. The thermo-cure agent of the ink ensures that the print fuses into the coatings 2 and 6 as they harden fully into one, and the epoxy coating 6 fuses into the polyester coating 2 between the elements of ink 5.

Heat for bringing the coatings 2 and 6 and the ink 5 into the fully-cured state is applied through the sheet 1 from below to raise the temperature of the powders to some 200 degrees Celsius, in the curing oven. The general form of the curing oven is illustrated in FIG. 3 where the glass sheet 1 carrying the uncured coatings 2 and 6 is shown being moved in the direction of the arrow A from one to another of a pair of delivery rollers 20 (which are surfaced with glass fibre or other heat-resistant material) of the conveyor system of the manufacturing plant.

Figure 3:
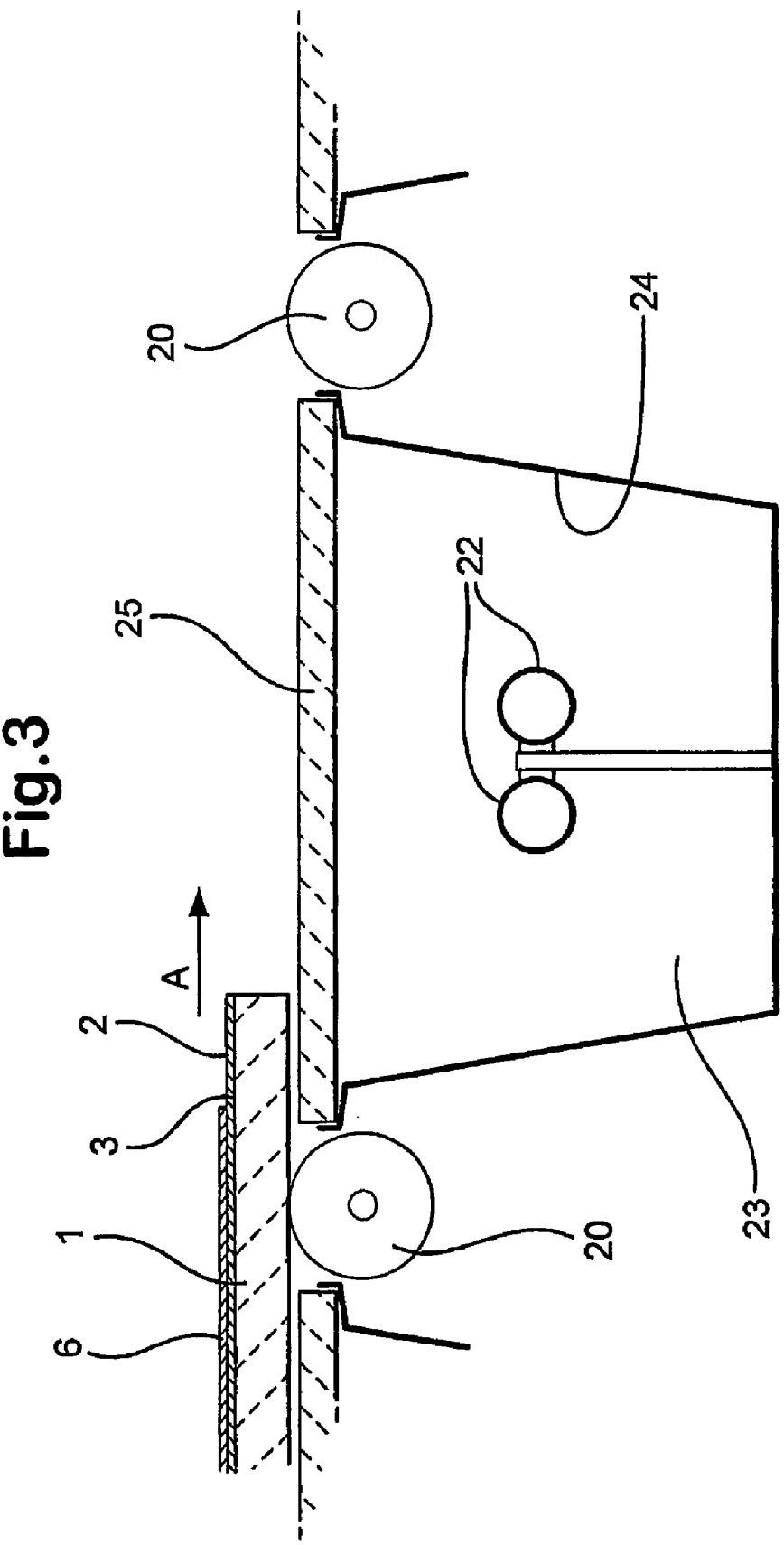
FIG. 3 is illustrative of an oven used in the manufacture of the panel of FIGS. 1 and 2.

Referring to FIG. 3, the oven includes two elongate, tubular infra-red lamps 22 that are contained within a box or trough 23 that is set between the rollers 20. The trough 23 has a highly-reflective internal surface 24 and a lid 25 of a borosilicate glass, and the rollers 20 hold the sheet 1 at a spacing of 3 mm above the lid 25 and about 75 mm above the lamps 22. During operation, the air in the trough 23 becomes superheated so that owing to the proximity of the glass sheet 1 to the lid 25, heat is transmitted to it mainly by conduction across the gap from the lid 25 as well as to a lesser extent by radiation from the lamps 22. Radiation from the lamps 22, as well as to a lesser extent conduction upwardly through the sheet 1, heats the coating 2 and brings about fusion progressively upwards through the epoxy powder material, resulting in cure of the coating 2 and ink 5 as well as of the coating 6. The heating from below, as with the polyester coating 2, reduces the likelihood of defects in the resultant coating 6.

The environment within the oven above the sheet 1 is closely controlled, the temperature being kept as near ambient as possible without disturbing the epoxy powder; air circulation has less effect as the powder cures Furthermore, the radiation from the lamps 22 is controlled in frequency to give high-frequency radiation initially, reducing in steps or otherwise to low-frequency radiation as the powder cures. The use of high frequency has advantage for rapid heating whereas the lower frequencies are more efficient for curing the powder.

The same general construction of oven as that illustrated in FIG. 3 used for the curing step, may be used for the process step of pre-heating the glass sheet 1 prior to deposition of the polyester powder for the coating 2, and also for the step in which the polyester powder is heated to the gel state. Indeed, all three steps may be carried out in the oven of FIG. 3 by successive passes of the glass sheet 1 through it.

The polyester powder contains a silane-enriched extender for promoting adhesion of the coating 2 with the glass surface 3. However, as an alternative, a silane film may be sprayed onto the surface 3 prior to deposition of the powder; the silane spray may be applied after the sheet 1 has been heated to 50 degrees Celsius and before it is pre-heated to 160 degrees Celsius.

The epoxy coating 6 acts as a water and moisture barrier to the extent that it does not need to be protected from weathering. However, the metal-foil strip 7 is applied to the side-edges of the panel to afford protection in this regard to the polyester coating 2, and to its interface with the glass surface 3 and coating 6. The foil strip 7, which has a thickness of 80-100 µm and is in the form of self-adhesive tape, is wrapped round the panel to adhere to the four side edges and also in overlap throughout its longitudinal margins 8 and 9, to the surfaces 10 and 11 respectively. The width of the margin 8 is 6 mm or less, whereas the width of the margin 9 is within the range of 100-150 mm, but is preferably substantially 125 mm, i.e., the width of the margin 9 is greater than the width of the margin 8. The purpose of the large-width margin 9 is to ensure that there is efficient conduction of heat from the central region of the panel to its outer edges, making the panel safe from thermal stress. This has the advantage that it is possible to use annealed, float glass for the sheet 1 in circumstances, for example in an outside architectural context, where the thermal stress experienced by the panel would allow only toughened (alternatively known as 'heat-strengthened') glass to be used.

Bonding of the metal-foil strip 7 to the epoxy coating 6 may be enhanced, or achieved without the use of self-adhesive tape, by bringing the foil into contact with the melted epoxy powder of coating 6 before it cures, using the adhesion techniques described in GB-A-2 207 089 or GB-A-2 252 079.

Where the panel of FIGS. 1 and 2 is for use inside a building and not likely to be subject to moisture, it is possible to utilize a polyester powder for the coating 6 rather than an epoxy powder.

The manufacturing method described above may be carried out with or without the printing step. Where printing is not required, deposition of the epoxy powder for the coating 6 may be carried out before the polyester powder for the coating 2 has been fused. Deposition of a layer of the epoxy powder is in this case made onto a deposited layer of the polyester powder, powder upon powder, before heat is applied through the glass sheet 1 to melt both powders and cure them (for example using the oven of FIG. 3). Because the heat is conducted upwardly from the sheet 1, curing of the polyester powder will (or with appropriate choice of powder mix can be arranged to) occur before that of the epoxy powder. It is also possible to use the same technique of deposition of powder upon powder where two polyester powders having different cure rates are used.

The panel described above may be used in the context of providing a spandrel for use in glazing a building. The described panel may in this context provide the inner-wall panel 31 of a double-glazed spandrel unit illustrated in FIGS. 4 and 5.

Figure 4:
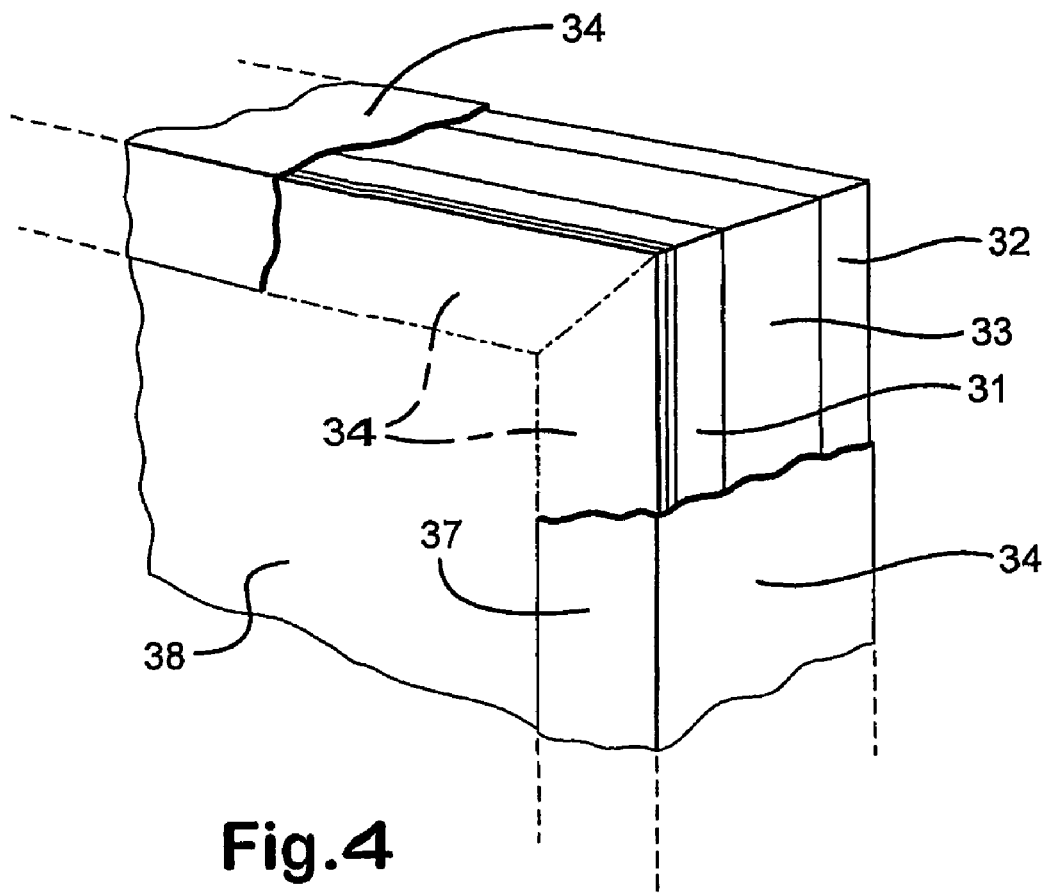
FIG. 4 is a perspective illustration from the rear of part of a double-glazing unit incorporating a slightly-modified form of the panel of FIGS. 1 and 2.
Figure 5:
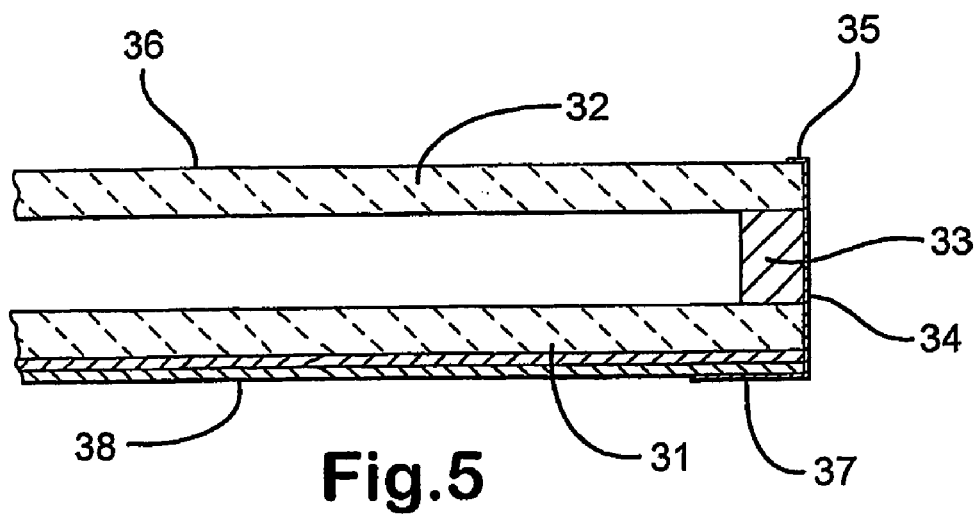
FIG. 5 is a cross-section of part of the double-glazing unit of FIG. 4.

Referring to FIGS. 4 and 5, the panel 31 is located in the double-glazed spandrel unit behind a rectangular, facing sheet 32 of partially-transparent or tinted glass (having a thickness, for example, of 6 mm). The panel 31 and the sheet 32 are separated from one another in the spandrel unit by a spacer 33 (having a thickness, for example of 12 mm).

The epoxy coating 6 of the panel 31 may be opaque and may be of white or dark color, and the foil strip 7 instead of covering the side-edges of just the panel 31 may, as illustrated in FIGS. 4 and 5, be replaced by an aluminum-foil strip 34. The strip 34, which has a thickness within the range 75-150 µm, covers the whole of the side-edges of the spandrel unit as well as wrapping round along its longitudinal margin 35 onto the front face 36 of the sheet 32, and also along its longitudinal margin 37 onto the epoxy coating of the back face 38 of the panel 31.

The foil strip 34 of the unit of FIGS. 4 and 5, like the foil strip 7 of the panel of FIGS. 1 and 2, provides a barrier to the ingress of moisture at the edges of the unit. The margins 35 and 37 of the strip 34, wrapping over the edges onto the front and back faces 36 and 38, preserve the integrity of this barrier, but the margin 37 has the additional function of relieving thermal stress in the glass of panel 31.

Thermal stress that can result in failure of a glass panel such as the panel 31, arises from the existence of temperature gradient from point to point across the panel. The use of a metal foil to cover the whole of the back face 11 or 38 of the panel of FIGS. 1 and 2 or the panel 31 would be effective, because of its high thermal conductivity, in reducing temperature gradient and accordingly in relieving thermal stress. However, it has been found that where the moisture barrier afforded by the full covering of foil is not required (as, for example, in the epoxy-resin backed panel 31), the advantage of significant thermal-stress relief to avoid failure, can still be achieved without the need for a full foil-backing.

More particularly in this respect, it has been found that the use of an element or elements of metal-foil such as provided by the margin 7 or 37 covering the back face 11 or 38 for a limited distance of 100-150 mm inwardly from the edges of the panel of FIGS. 1 and 2 or the panel 31, can give adequate relief for protecting the respective panel against failure under thermal stress.

Use of the panel 31 in the spandrel unit, exposes it to solar radiation which will give rise to temperature gradients in the panel 31 that may vary significantly with partial shading and other factors. However, it has been found that adequate thermal-stress relief is provided where the metal foil covers the back face 38 inwardly from its edges by a distance in the range 100-150 mm. The preferred distance in the case of the panel 31 is substantially 125 mm and the thickness of the foil is preferably substantially 80 µm.

The invention claimed is:

1. A powder-coated glass product including a glass substrate exhibiting thermal-stress relief, wherein the glass substrate comprises a back surface and a side surface, the back surface of the glass substrate being coated by a coating of a thermosetting powder and a metal foil is bonded to the coating of the thermosetting powder to relieve thermal stress in the glass substrate, the metal foil extending inwardly across the coating of the thermosetting powder from the side surface of the glass substrate, wherein the metal foil extends inwardly across the coating of the thermosetting powder from the side surface of the glass substrate by a distance within a range of 100-150 mm for reduction of thermal stress in the glass substrate, the metal foil is further bonded to the side surface and a front surface of the glass substrate, the metal foil extending across the front surface of the glass substrate from the side surface of the glass substrate by a distance of 6 mm or less.

2. The powder-coated glass product according to claim 1, wherein the metal foil has a thickness within a range 75-150 µm.

3. The powder-coated glass product according to claim 2, wherein the thickness is approximately 80 µm.

4. The powder-coated glass product according to claim 1, wherein the coating is an epoxy-resin coating.

5. A glass panel manufactured by a method of manufacturing a powder-coated glass panel wherein the panel includes a glass substrate having first and second surfaces, and the method comprises:
   a step of depositing thermosetting powder on the first surface of the glass substrate;
   a step of curing the thermosetting powder to form a coating on the first surface of the glass substrate, the step of the curing the thermosetting powder comprising application of heat to the thermosetting powder by transmission of the heat through the glass substrate from the second surface to the first surface of the glass substrate;
   a step of bonding metal foil to the coating on the first surface of the glass substrate to form a thermal stress reducing first border; and
   a step of bonding metal foil to the second surface of the glass substrate to form a second border, the first border having a greater width than a width of the second border.

6. A glass spandrel panel having thermal-stress relief, the glass spandrel panel comprising a facing glass sheet and a glass substrate spaced parallel behind the facing sheet, wherein the glass substrate is backed by a thermosetting powder coating, and a metal foil is bonded to a back surface of the thermosetting powder coating to afford thermal-stress relief to the glass substrate, the metal foil extending inwardly across the back surface from edges of the coating, wherein the metal foil extends inwardly only partially across the back surface of the thermosetting powder coating from the edges by a distance of between 100-150 mm for reduction of thermal stress in the glass substrate, and the metal foil wraps over edges of the glass substrate and extends inwardly across the facing glass sheet from the edges of the glass substrate by a distance of 6 mm or less to provide a barrier to ingress of moisture between the facing glass sheet and the glass substrate.

7. A method of manufacturing a power-coated glass product with the product including a glass substrate having first and second surfaces, the method comprising:
   a step of depositing thermosetting powder on the first surface of the glass substrate with the first surface being an uppermost of the first and the second surfaces of the glass substrate; and
   a step of curing the thermosetting powder to form a coating on the first surface of the glass substrate, the step of the curing the thermosetting powder comprising application of heat to the thermosetting powder from a source of infra-red radiation located below the second surface of the glass substrate, the source of infra-red radiation applying the infra-red radiation, via the second surface of the glass substrate, for heating the thermosetting powder, the application of heat to the thermosetting powder being partly by transmission of the heat conducted through the glass substrate from the second surface to the first surface of the glass substrate and partly by transmission of the infra-red radiation through the glass substrate to the thermosetting powder; and
   bonding a metal foil to a back surface of the coating for reduction of the thermal stress in the glass substrate, the metal foil extending inwardly from edges of the coating across the back surface by a distance within a range of 100-150 mm and being bonded to the second surface of the glass substrate, and the metal foil extending inwardly from edges of the glass substrate across the second surface of the glass substrate by a distance of 6 mm or less.

8. The method according to claim 7, wherein the distance that the metal foil extends inwardly from the edges of the coating across the back surface is approximately 125 mm.

9. The method according to claim 7, wherein the metal foil has a thickness within a range 75-150 µm.

10. The method according to claim 9, wherein the thickness is approximately 80 µm.

11. A method of manufacturing a powder-coated glass product, the product including a glass substrate having first and second surfaces, and the method comprising the steps of:
   depositing thermosetting powder on the first surface of the glass substrate with the first surface uppermost of the first and the second surfaces of the glass substrate; and curing the thermosetting powder deposited on the first surface by application of heat to the deposited thermosetting powder to form a coating on the first surface of the glass substrate, the application of the heat to the thermosetting powder being from a source of infra-red radiation located below the second surface of the glass substrate to apply the infra-red radiation to the second surface, the source of infra-red radiation comprising a box having a borosilicate glass lid and at least one infra-red lamp within the box for emitting the infra-red radiation through the glass lid for transmission of the infra-red radiation through the glass substrate from the second surface to the thermosetting powder deposited on the first surface of the glass substrate, the transmission of the infra-red radiation through the glass substrate to the thermosetting powder deposited on the first surface fusing the thermosetting powder progressively upwards within the thermosetting powder from the first surface to cure the thermosetting powder; and bonding a metal foil to a back surface of the coating for reduction of the thermal stress in the glass substrate, the metal foil extending inwardly from the edges of the coating across the back surface of the coating by a distance within a range of 100-150 mm, the metal foil is further bonded to a side surface and extending inwardly from the edge of the glass substrate across the second surface of the glass substrate by a distance of 6 mm or less.

12. A method of manufacturing a powder-coated glass product with the product including a glass substrate having first and second surfaces, the method comprising:
a step of depositing two thermosetting powders on the first surface of the glass substrate with the first surface being an uppermost surface of the first and the second surfaces of the glass substrate;
a step of curing the two thermosetting powders to form a coating on the first surface of the glass substrate, the step of curing the thermosetting powder comprising application of heat to the two thermosetting powders from a source of infra-red radiation located below the second surface of the glass substrate, the source of infra-red radiation applying the infra-red radiation, via the second surface of the glass substrate, to heat the thermosetting powder, and the application of heat to the thermosetting powder being partly by transmission of the heat conducted through the glass substrate from the second surface to the first surface of the glass substrate and partly by transmission of the infra-red radiation through the glass substrate to the thermosetting powder;
the step of depositing the two thermosetting powders further comprises the step of depositing the two thermosetting powders, one after the other, on the first surface of the substrate for forming a first coating on the substrate and a second coating on the first coating, and applying heat to cure both of the two thermosetting powders into the first and the second coatings by transmission through the substrate; and
bonding a metal foil to a back surface of the second coating for reduction of thermal stress in the glass substrate, the metal foil extending inwardly from edges of the second coating across its back surface by a distance within a range 100-150 mm the metal foil is further bonded to a side surface and extending inwardly from the edge of the glass substrate across the second surface of the glass substrate by a distance of 6 mm or less.

* * * * *